June 9, 1953  H. M. HUNTER ET AL  2,641,356
CENTER SCROLL BEARING
Filed Nov. 12, 1947  3 Sheets-Sheet 1
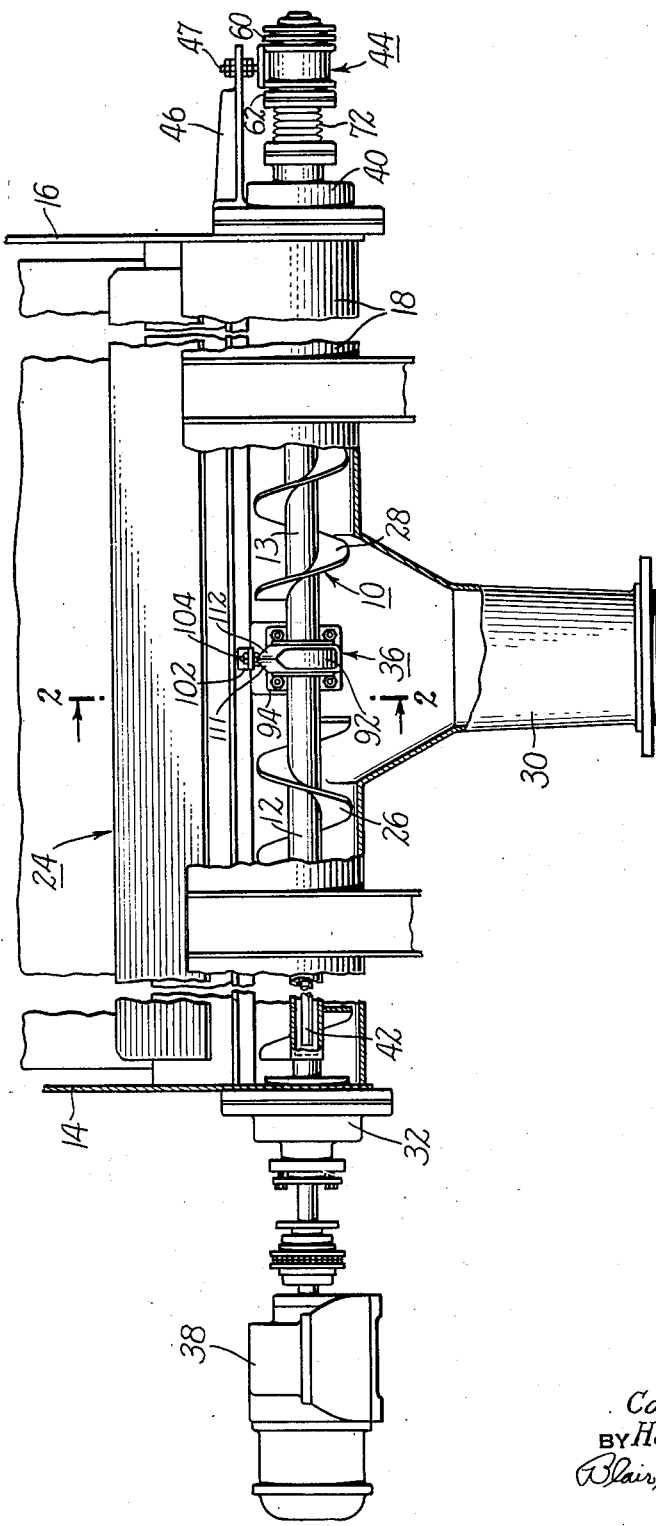
INVENTORS
Carrel C. Bryant
BY Henry M. Hunter
Blair, Curtis + Hayward
ATTORNEYS

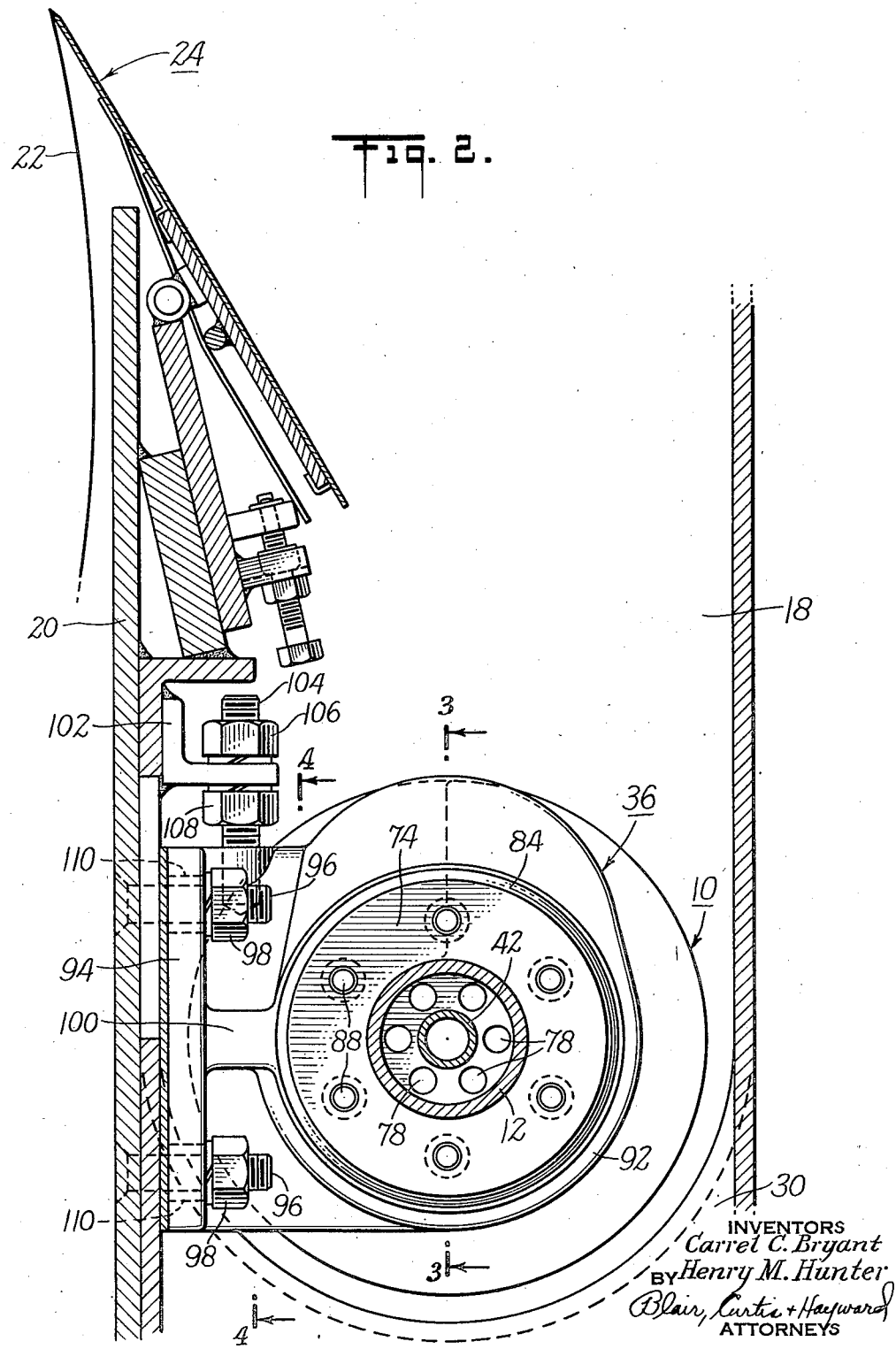

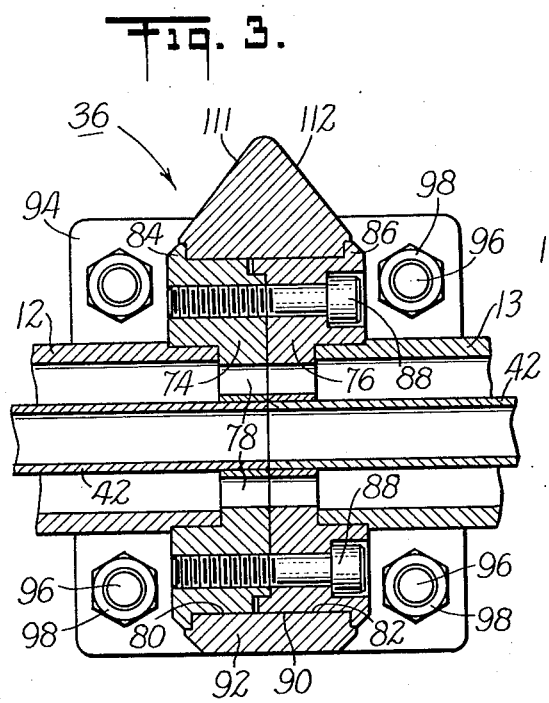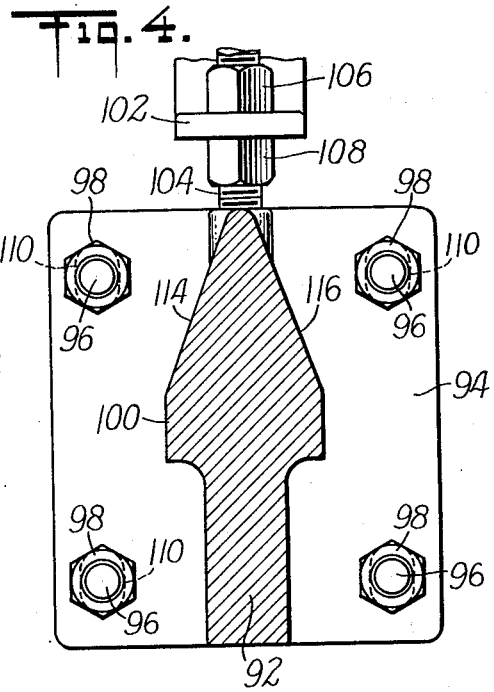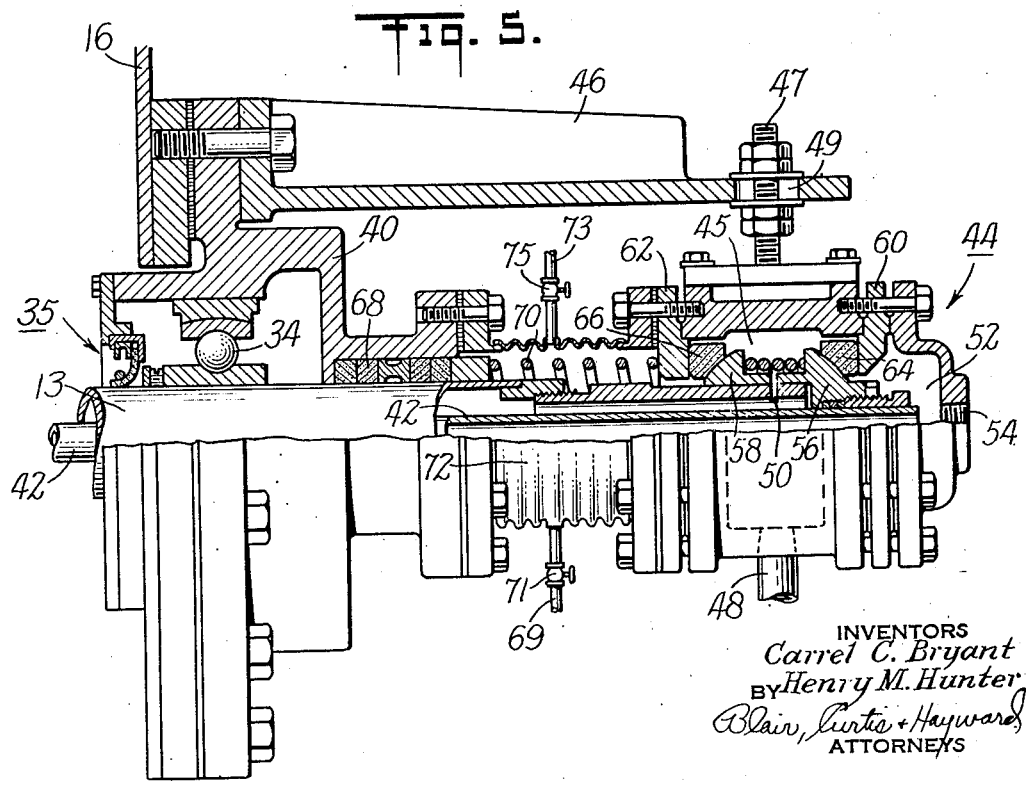

UNITED STATES PATENT OFFICE 2,641,356

CENTER SCROLL BEARING

Henry M. Hunter, Brooklyn, N. Y., and Carrel C. Bryant, Caldwell, N. J., assignors, by mesne assignments, to General American Transportation Corporation, Chicago, Ill., a corporation of New York Application November 12, 1947, Serial No. 785,251

5 Claims. (Cl. 198—217)

This invention relates to continuous filters and more particularly to an improved bearing assembly and discharge scroll mounting adapted to be used in conjunction with such a filter. Although not limited in its application thereto, the present bearing assembly and scroll mounting may be advantageously used in conjunction with a rotary filter employed in the dewaxing of petroleum oils and will be illustratively described as incorporated in such a filter.

In the refining of petroleum products it is frequently desirable to remove certain solid or semi-solid waxy components of the petroleum from liquid components, e. g., lubricating oils, in which the waxes are dissolved. The separation is commonly effected by processes which include chilling the oil to cause the wax to come out of solution and then separating the wax from the oil by filtration. The filtration may be carried out by means of a rotary filter comprising a rotatable cylinder having a permeable wall, and a container for the oil-wax mixture in which the cylinder is partially immersed. The permeable wall of the cylinder may comprise a filtering medium in thin sheet form, a support for the filtering medium and protecting wires on the outer surface of the filtering medium. The cylinder is rotated in the oil-wax mixture and the inner surface of the filtering medium is subjected to a vacuum to produce a pressure gradient that tends to cause oil to flow through the permeable wall of the cylinder, leaving the wax deposited on the filtering medium. The wax is removed by a scraper blade so mounted that it bears against the protecting wires of the filter as the cylinder rotates. As each portion of the surface of the cylinder approaches the scraper blade, the vacuum is cut off and in some cases air or gas under pressure is supplied to the inside of the filtering medium to loosen the wax layer thereon and assist the scraper in removing the wax from the filtering medium. The wax that is scraped from the cylinder falls into a vat and is caused to flow toward a discharge port in the vat by a scroll, i. e., a rotating screw conveyer.

In the operation of such a filter there is a tendency for the wax to adhere to any surfaces that it may fall on within the vat, and hence it is desirable that the discharge scroll and its mounting be so constructed as to minimize the projected horizontal areas of the structure and thus minimize the areas on which wax can fall, thereby reducing the quantity of wax retained on the various parts of the scroll and its mounting. In order to free the scroll itself from wax adhering thereto, it may be desirable to heat the interior of the scroll with a heating medium. Also, more effective flow of the wax toward the discharge port may be achieved if the space between the scroll and the bottom of the vat is free from obstruction. Therefore it is desirable that the discharge scroll be so mounted as to leave this space relatively free.

It is accordingly an object of the present invention to provide a discharge scroll bearing and mounting adapted to be used with a rotary dewaxing filter and so constructed as to minimize the area for retention of wax on the scroll and its mounting. It is another object of the invention to provide such a discharge scroll bearing construction that reduces to a minimum the obstruction to flow of wax toward the discharge port of the vat into which the filtered wax falls. It is still another object of the invention to provide a discharge scroll bearing that is easily adjustable. It is still a further object of the invention to provide an improved mounting for a screw conveyer that is simple and compact in construction. Other objects of the invention will be in part obvious and in part pointed out hereafter.

The many objects and advantages of the present invention may best be appreciated by referring to the accompanying drawings which incorporate a preferred embodiment of the present invention and wherein:

Figure 1 is a front elevation view partly broken away to show the mounting of the discharge scroll in the vat and its relationship to the discharge port of the vat;

Figure 2 is a vertical section taken on the line 2—2 of Figure 1 and showing the relationship between the scraper blade that scrapes the wax from the cylinder and the scroll bearing and its mounting;

Figure 3 is a vertical section taken on the line 3—3 of Figure 2 showing the details of the scroll bearing;

Figure 4 is a section taken on the line 4—4 of Figure 2 and showing the construction of the supporting bracket for the scroll bearing; and Figure 5 is a side view partly in section showing one of the end bearings of the discharge scroll, the manner in which the heating medium is supplied to the interior of the scroll shaft, and the manner in which the end of the shaft is sealed.

Referring to the drawings and more particularly to Figures 1 and 2 thereof, the numeral 10 generally designates a scroll or screw conveyer that comprises two oppositely acting conveyer sections 26 and 28 mounted respectively on the shafts 12 and 13. The outer ends of shafts 12 and 13 pass through the side walls 14 and 16 respectively of a vat 18 and are rotatably supported in the journal bearings 32 and 34 respectively mounted in the side walls 14 and 16. The vat 18 is mounted adjacent to the side wall 20 of a filter tank in which a cylindrical rotary filter element revolves. The cylindrical surface of the rotary filter element is represented by the curved line 22 in Figure 2. As described above, wax is deposited on the filter 22 as the cylindrical filter element revolves and is scraped or deflected therefrom by a scraper 24. After being removed from the surface 22 the wax flows down the upper surface of scraper 24 and falls into the vat 18.

The conveyer sections 26 and 28 are so constructed and mounted that as they rotate they cause wax falling on the conveyer to flow toward the center of the vat where it is discharged through the discharge port 30. The inner adjacent ends of the conveyer sections 26 and 28 are supported in a center bearing 36 described in detail hereafter. The conveyer 10 is rotated through the shaft 12 by any suitable means such as the motor 38 to cause the wax to move in the desired manner toward the discharge port 30.

As previously pointed out it is desirable that the conveyer 10 be internally heated to prevent the wax from adhering to the surface thereof, and the manner in which this internal heating is effected is best shown in Figure 5 of the drawings. Referring to Figure 5 the outer end of shaft 13 extends through the side wall 16 of the vat 18 and is supported by the journal bearing 34 which is a self-aligning bearing and is mounted in a packing flange 40 fixed to the side wall 16. A conventional seal 35 protects the bearing against entrance of foreign substances from the vat 18. The shafts 12 and 13 are hollow and are provided with a central tube 42 which is mounted within the shafts 12 and 13 to form an annular space through which heating medium may flow. As shown in Figure 1 tube 42 extends almost but not quite to the end of the hollow portion of shaft 12. Referring again to Figure 5 the outer end of shaft 13 is embraced by a housing 44 which is supported from the side wall 16 by bracket 46 by means of one or more bolts 47 laterally slidable in slot 49 of bracket 46 and defines a feed chamber 45 to which heating medium is supplied through a pipe 48. Heating medium flows from the feed chamber 45 through a passage 50 to the annular space between shafts 12 and 13 and tube 42 and then along this annular space to the opposite end of the tube 42, whence it flows through the interior of tube 42 back to the housing 44, and more particularly to a discharge chamber 52 thereof, from which it is withdrawn through a connection 54. If desired, flow may be in the reverse direction, entering chamber 52 and leaving from chamber 45.

In order to prevent leakage from the feed chamber 45 of housing 44 to the atmosphere and by-passing of heating medium from the feed chamber 45 to the discharge chamber 52, the shaft 13 is provided with packing shoulders 56 and 58 which are fixed to the shaft 13 and rotate therewith. Housing 44 is provided with packing flanges 60 and 62 that are fixed to the housing and do not rotate with shaft 13. Interposed between the packing shoulder 56 and packing flange 60 and between shoulder 28 and packing flange 62 are the packing rings 64 and 66 respectively. Packing ring 64 tends to prevent by-passing of heating medium from the feed chamber 45 to the discharge chamber 52, and packing ring 66 tends to prevent flow of heating medium to the atmosphere. The housing 44 and its associated parts are adapted to maintain a seal despite eccentric motions of the shaft.

In order to prevent leakage of material from the interior of vat 18 along the surface of shaft 13, a conventional resilient packing 68 is provided adjacent the outer surface of the shaft. A coil spring 70 surrounds the shaft 13 and is so positioned that it bears against the resilient packing 68 at one end and the packing flange 62 at its other end, and thus serving to exert a continuous force on packing 68. In order to catch any heating medium that may leak past the packing ring 66 on the one hand, or material from the interior of tank 16 that may leak through the packing 68 on the other hand, a flexible bellows 72 is provided surrounding the coil spring 70 and fixed at one end to the packing flange 62, and at its other end to the packing flange 40. With this construction separate packings are provided to substantially prevent leakage of heating medium on the one hand, and material within the vat 18 on the other hand from leaking along the shaft 13. In the event some leakage occurs, the bellows 72 prevents the escape of such leakage materials.

The bellows 72 permits relative axial movement of housing 44 including its component sealing members and the shaft 13 with its associated parts to accommodate either natural movement of the shaft or wear on the sealing members, while at the same time confining escaping materials to the interior of the assembly.

The bellows 72 is provided with a discharge pipe 69 containing a valve 71 and an inlet pipe 73 containing a valve 75. Heating medium that leaks into the bellows may be conducted therefrom through pipe 69 to a sump, drain or the like or returned to the process at a suitable point. Air or another fluid under pressure may be supplied through pipe 73 to the interior of the bellows to act as a seal to prevent leakage of heating medium into the bellows and thereby prevent the heating medium from coming in contact with packing 68. Also air or gas may be supplied to the bellows 72 under pressure to force liquid from the bellows through discharge pipe 69.

The center bearing 36 of the conveyer is so constructed as to minimize the surface area on which wax can collect, and the details of the construction of this center bearing are best shown in Figure 3 of the drawings. Referring to Figure 3 the adjacent ends of the conveyer sections 26 and 28 and more particularly of shafts 12 and 13 are provided respectively with the flanges 74 and 76 which have the holes 78 therein to permit flow of heating medium in the annular space between tube 42 and the shafts 12 and 13. Flanges 74 and 76 are provided at their peripheries with the bearing surfaces 80 and 82 that extend from the abutting faces of the flanges outwardly to the retaining rings or flanges 84 and 86 respectively. The flanges 74 and 76 are held together in any suitable manner such as by means of the bolts 88. The bearing surfaces 80 and 82 confront the bearing surface 90 of a bearing ring 92 that surrounds the shaft, the construction being such that the bearing surface 90 fits between the retaining rings 84 and 86 of the flanges 74 and 76 respectively.

Referring to Figure 2 the bearing ring 92 is supported on an adjustable bracket 94 bolted to the side wall 20 of vat 18 by stud bolts 96 and nuts 98. The bracket 94 has an arm 100 that is fixed to and supports the bearing ring 92, and thus supports the center of the conveyer 10.

It is desirable that the center bearing 36 be vertically adjustable and for this purpose an adjusting bracket 102 is provided that is fixed to the side wall 20 of the vat. The bracket 102 receives a stud bolt 104 that is threaded into the bracket 94 and has threaded thereon the nuts 106 and 108 which may be rotated to vary the vertical height of the bearing 92. Two nuts 106 and 108 are provided so that the bearing may be locked in position when the desired adjustment has been made. The bracket 94 is constructed with slots 110 through which the bolts 96 pass in such manner that the bracket may be moved vertically to effect the desired adjustment.

Referring now to Figures 3 and 4 the exposed portions of the center bearing 36 of the conveyer are so constructed as to minimize the possibility of wax that falls on the bearing assembly being retained thereon. Thus the upper portion of the bearing ring 92 is tapered upwardly and inwardly to form sloping surfaces 111 and 112 which tend to shed wax falling thereon. In like manner the arm 100 of bracket 94 that supports the bearing ring 92 is also provided with the upwardly and inwardly tapered surfaces 114 and 116 that shed wax falling thereon.

The operation of the present structure should be largely apparent from the foregoing description. Wax is scraped by the scraper 24 from the surface 22 of the rotary filter element, slides down the upper surface of scraper 24 and falls into the vat 18. Within the vat it is moved by rotation of the conveyer 10 and more particularly by the oppositely curved conveyer sections 26 and 28 toward the center of the vat 18 from which it is discharged through the port 30. In order to prevent adherence of the wax to the surface of the conveyer 10, the conveyer is internally heated by a heating medium supplied through the pipe 48 and discharged through the discharge connection 54.

The center bearing 36 is mounted on the side wall of the vat which carries the scraper blade 24, and hence the adjusting mechanism for adjusting the vertical elevation of the center bearing is protected from falling wax by the scraper blade. The portions of the center bearing on which wax may fall have sharply tapered surfaces adapted to shed the wax. Since the center bearing 36 is supported from the side wall of the vat, there is no obstruction to flow of wax between the bottom of the conveyer and the bottom of the vat 18. Thus the present construction serves to minimize the amount of wax retained within the vat due to adherence on the various parts of the conveyer and its mounting.

The structure of the center bearing 36 is unusually compact. The flanges 74 and 76, having bearing surfaces that cooperate with the bearing surface 90 of the bearing ring 92, provide a narrow bearing assembly with a minimum of projected horizontal area and hence a minimum area on which wax might be retained.

It is to be understood that the structure illustrated in the drawings is illustrative only and that numerous modifications within the scope of the invention will occur to those skilled in the art. Thus the present bearing assembly has been described as applied to the discharge scroll of a rotary dewaxing filter, but it is apparent that the structure may be used with advantage in many other types of applications wherein a material is fed to a screw conveyer from a point above the conveyer.

Since many embodiments might be made of the present invention and since many changes might be made in the embodiment disclosed herein, it is to be understood that the foregoing description is to be interpreted as illustrative only and not in a limiting sense.

We claim:

1. In continuous filtering apparatus of the type wherein a substance is removed from the surface of a rotatable cylindrical filter and falls into a vat having a discharge connection toward which the substance is moved by a pair of axially aligned screw conveyers mounted in said vat, a bearing assembly for supporting said conveyers at adjacent ends thereof, comprising in combination, a first flange fixed to the adjacent end of one of the said conveyers and having a peripheral bearing surface, a second flange fixed to the adjacent end of the other of said conveyers and having a peripheral bearing surface, fastening means for holding said two flanges together, a bearing bracket mounted on a side wall of said vat and a bearing fixed to said bracket and having a bearing surface cooperating with the peripheral bearing surfaces of said flanges rotatably to support said conveyers, the top of said bearing and the adjacent portions of said bracket being tapered upwardly and inwardly to form sloping surfaces that shed said substance as it falls into said vat from said surface of said cylinder.

2. In continuous filtering apparatus of the type wherein a substance is removed from the surface of a rotatable cylindrical filter and falls into a vat having a discharge connection toward which the substance is moved by a pair of axially aligned screw conveyers mounted in said vat, a bearing assembly for supporting said conveyers at adjacent ends thereof, comprising in combination, a first flange fixed to the adjacent end of one of said conveyers and having a peripheral bearing surface, a second flange fixed to the adjacent end of the other of said conveyers and having a peripheral bearing surface, each of said flanges having a retaining rim extending beyond its bearing surface, a bearing bracket mounted on a side wall of said vat and a bearing fixed to said bracket and having a bearing surface confronting the bearing surfaces of said flanges and extending between said retaining rims, whereby the adjacent ends of said conveyer are rotatably supported and said retaining rims cooperate with said bearing ring to prevent axial movement of said conveyers.

3. A bearing assembly adapted to be used in supporting a screw conveyer for conveying a substance which is fed to said conveyer from a point above said conveyer, said bearing assembly comprising a flange fixed to the shaft of said conveyer and having a peripheral bearing surface, and a fixed bearing ring having an internal bearing surface cooperating with said peripheral bearing surface to rotatably support said conveyer, said bearing ring being provided with upwardly and inwardly tapered surfaces forming a peaked top adapted to shed said substance as it falls on said conveyer.

4. A bearing assembly adapted to be used in supporting adjacent ends of a pair of axially aligned screw conveyers for conveying a substance which is fed to said conveyers from a point above the conveyers, said bearing assembly comprising a first flange fixed to the adjacent end of one of said screw conveyers and having a peripheral bearing surface, a second flange connected to the adjacent end of the other of said screw conveyers and having a peripheral bearing surface, fastening means for fastening said flanges together, and a fixed bearing ring having a bearing surface cooperating with the peripheral surfaces of said flanges to rotatably support said adjacent ends of said conveyers, the top of said bearing ring being provided with upwardly and inwardly tapered surfaces forming a peaked top adapted to shed said substance as it is fed to said conveyers.

5. A bearing assembly adapted to be used in supporting adjacent ends of a pair of axially aligned screw conveyers for conveying a substance which is fed to said conveyers from a point above the conveyers, said bearing assembly comprising a first flange fixed to the adjacent end of one of said conveyers and having a peripheral bearing surface, a second flange connected to the adjacent end of the other said conveyers and having a peripheral bearing surface, each of said flanges being provided with a retaining rim extending beyond its bearing surface, fastening means for fastening said two flanges together, and a fixed bearing ring confronting the bearing surface of said flanges and having a bearing surface extending between said retaining rims, whereby said adjacent ends of said conveyer are rotatably supported and said bearing ring cooperates with said retaining rims to prevent axial movement of said conveyers with respect to said bearing ring, said bearing ring being provided with upwardly and inwardly tapered surfaces forming a peaked top adapted to shed said substance as it is fed to said conveyers.

HENRY M. HUNTER.
CARREL C. BRYANT.

References Cited in the file of this patent
UNITED STATES PATENTS

| Number | Name | Date |
|---|---|---|
| 725,284 | Perkins | Apr. 14, 1903 |
| 803,777 | McConnell | Nov. 7, 1905 |
| 1,274,548 | Holnagel | Aug. 6, 1918 |
| 1,491,401 | Himmelsbach | Apr. 22, 1924 |
| 1,579,178 | Reynolds | Mar. 30, 1926 |
| 1,829,392 | Caldwell | Oct. 27, 1931 |
| 1,972,848 | Malkin | Sept. 4, 1934 |
| 1,991,432 | Valentine | Feb. 19, 1935 |
| 2,260,812 | Kozak | Oct. 28, 1941 |
| 2,385,238 | Tarbox | Sept. 18, 1945 |